Patented Nov. 5, 1929

1,734,726

UNITED STATES PATENT OFFICE

ISAAC HARTER, OF DONGAN HILLS, NEW YORK; AND ANTHONY M. KOHLER, OF JERSEY CITY, NEW JERSEY

REFRACTORY PRODUCT AND PROCESS FOR MAKING THE SAME

No Drawing.    Application filed May 25, 1923.    Serial No. 641,519.

Our present invention relates to refractory products adapted for use under high temperature conditions and the processes for producing such refractories. More specifically our invention relates to alumina-silica refractories of high melting point.

We have found that a highly desirable refractory may be made if the constituents are melted, so as to permit the physio-chemical changes to take place in the material with the minimum of resistance to such changes. Using fairly pure alumina-silica compounds such as kaolin and highly refractory bauxite, we find that the shrinkage of the resulting product is substantially eliminated and that such refractory is capable of sustaining heavy loads under high temperature conditions. Furthermore, the tendency of the refractory to spall when subject to sudden changes in temperature is greatly minimized.

The melting of the materials forming the refractory product, however, introduces many technical difficulties, and we have found that substantially the same results may be obtained if, instead of actually raising the temperature of the materials to their melting points, we raise such materials to a temperature just short of such melting point.

In practice, we make such refractories by first burning some of the material to form blocks or "biscuits" of convenient size, then crushing the same and mixing this crushed material with a binder, after which the material may be molded into any desired shape and burned to cause the blocks to vitrify.

By the use of these high temperatures, we are able to use as a binder an alumina-silica material which is also highly refractory. Preferably, though not necessarily, we employ as binder, material of the same composition and melting point as the burned material or grog. In other words we may obtain a refractory product of uniform composition, the melting point and refractory qualities of which have not been adversely affected by a binding material of lower melting point.

As sources of the alumina and silica we prefer to use bauxite and kaolin, as these materials are abundant and may be obtained comparatively pure and of high melting point, but it will be understood that the use of alumina and silica from other sources is within the scope of our invention.

These materials may be mixed so as to give varying proportions of alumina and silica and a commercial product obtained, it being understood that the greater the proportion of alumina the greater the furnace temperature will be required. Preferably we use kaolin and bauxite in equal quantities. While attempts have been made to produce a refractory of this composition, no one, so far as we know, has produced in this manner, an article which has substantially the same elimination of shrinkage and other refractory qualities of the pure fused product.

As one preferred procedure, we give the following:

Approximately equal parts of crushed raw kaolin and ground bauxite are mixed and further ground, the mixing and grinding being conveniently carried out in a wet pan or other suitable apparatus, water being added so as to give a consistency desirable for forming the final products. This material when formed into blocks or biscuits and dried is burned in a suitable kiln or furnace at a temperature at least 90 per cent of the melting point temperature of the mixture, which, in the specific mixture referred to may be in the neighborhood of 3250 to 3300° F. After these burned biscuits are cooled, they are crushed to form the proper sized grog for its subsequent use. The product so made consists of clinkered particles which are dense and hard, are of irregular shape and are adapted to serve as the base for various refractory products including cements, etc.

To form fire-brick or other refractory articles, we preferably mix this grog which has been crushed say to about ⅛" size with the same mixture as a binder (bauxite and kaolin in equal portions), ground to about 20 mesh and fines and have found that satisfactory results will be obtained by the use of from 20 to 40 percent of binder. This mixture to which water has been added to give proper consistency, is now molded, tempered and if necessary re-pressed and dried, these steps being familiar to those skilled in the art.

The articles so formed are now fired, preferably to the same temperature at which the grog was burned, (or at 3000° F. and above) but good results may be attained by burning the shapes at considerably lower temperatures.

If desired a small quantity of an organic substance having marked cohesive properties such as glucose may be used to facilitate shaping and handling the "biscuit" this material being, of course, burnt out in the firing.

As has been stated, the proportions of bauxite and kaolin in the mixtures may be widely varied, and it will be understood that the example given is merely illustrative. Where different proportions of silica to alumina are used a satisfactory product will be had if the firing temperatures are maintained from 90% to within a few degrees of the melting point temperature of the mixture of the materials.

The temperatures referred to throughout the specification were obtained using optical pyrometers which were in agreement with the standard Seger cone-temperature scale, such for example as given in Ries, Clays, 2d ed. pages 182–183, New York 1908.

We claim:

1. A refractory article comprising particles of alumina-silica material having a greater alumina content and a higher melting point than kaolin and burned at a temperature of at least 90% of the melting point temperature of said material, said particles being bonded by alumina-silica material of a melting point at least equal to kaolin and burned at a temperature of not less than 3000° F.

2. A refractory article comprising particles of alumina-silica material having a greater alumina content and a higher melting point than kaolin and burned at a temperature of at least 90% of the melting point temperature of said material, said particles being bonded by alumina-silica material of substantially the same composition as that of said particles.

3. A refractory article comprising particles composed substantially of alumina and silica in the ratio of approximately one to one and burned at a temperature of at least 3000° F., said particles being bonded by material of substantially the same composition.

4. A refractory article comprising particles composed substantially of alumina and silica in the ratio of approximately one to one produced by mixing kaolin and bauxite in the proper proportions and burned at a temperature of at least 3000° F., said particles being bonded by material composed substantially of alumina and silica produced by mixing bauxite and kaolin and having a melting point at least equal to that of kaolin.

5. A refractory article comprising particles composed substantially of alumina and silica in the ratio of approximately one to one produced by mixing kaolin and bauxite in the proper proportions and burned at a temperature of at least 3000° F. said particles being bonded by material of substantially the same composition, the quantity of bond being approximately 30% by weight of said article.

6. The process of making refractory articles, which consists in mixing particles composed substantially of alumina and silica burned at a temperature of at least 3000° F. with ground unburned material of substantially the same composition and burning the mixture at a temperature sufficient to bond said particles.

7. The process of making refractory articles which consists in mixing particles composed substantially of alumina and silica in the ratio of approximately one to one burned at a temperature of at least 3000° F. with ground unburned material of substantially the same composition and burning the mixture at a temperature sufficient to bond said particles.

8. The process of making a shaped kiln-burned refractory article which consists in mixing particles composed of approximately equal parts kaolin and bauxite and burned at a temperature of at least 90% of the melting point temperture of said particles with ground unburned material of substantially the same composition forming the mixture into the desired shape and burning at a temperature sufficient to bond said particles.

ISAAC HARTER.
A. M. KOHLER.